United States Patent [19]

Petronis et al.

[11] Patent Number: 5,086,901
[45] Date of Patent: Feb. 11, 1992

[54] ROBOT OVERLOAD DETECTION DEVICE

[75] Inventors: Thomas J. Petronis, Clifton Park; Clifford C. Annis, Schenectady, both of N.Y.

[73] Assignee: Applied Robotics, Inc., Schenectady, N.Y.

[21] Appl. No.: 655,550

[22] Filed: Feb. 14, 1991

[51] Int. Cl.$^5$ .................. B25J 19/06; B25J 19/02; F16D 43/28
[52] U.S. Cl. .................. 192/150; 192/56 F; 200/82 A; 251/359; 403/31; 901/49
[58] Field of Search .......... 192/56 F, 150; 200/82 R, 82 A; 251/359; 403/31; 901/49

[56] References Cited

U.S. PATENT DOCUMENTS

| | | | |
|---|---|---|---|
| 2,147,243 | 2/1939 | Cornell, Jr. .................. | 251/359 |
| 4,215,254 | 7/1980 | Ohki .................. | 200/82 R X |
| 4,664,588 | 9/1989 | Newell et al. .................. | 414/730 |
| 4,714,865 | 12/1987 | Chin et al. .................. | 318/563 |

FOREIGN PATENT DOCUMENTS

| | | | |
|---|---|---|---|
| 3701651 | 8/1988 | Fed. Rep. of Germany ........ | 901/49 |
| 2189458 | 10/1987 | United Kingdom .................. | 901/49 |

OTHER PUBLICATIONS

"Automation Components", Barry Wright Corp. pp. 8-10.
"Your Turnkey Supplier of Robot End of Arm Tooling", EOA Systems, pp. 12-13.
"Omnidirectional Overload Detecting Clutch-Model 1000", PickOmatic Systems, 2 pages.
"MDI Wrist-Watch", Manufacturing Directives, Inc., 7 pages.
"Robotic Uni-Coupler Safety Joint", Robotic Accessories, 11 pages.
"Accu-Trip", Robotic Accessores, 2 pages.
"Versa-Matic", Robotic Accessories, 4 pages.
"Overload Protector Wrist-OPW", Mecanotron, 3 pages.
"Robotic Overload Clutch", Applied Robotics, Inc. 3 pages.

*Primary Examiner*—Allan D. Herrmann
*Attorney, Agent, or Firm*—Heslin & Rothenberg

[57] ABSTRACT

An overload detection device (100) adapted for mounting between the end of a robot arm (104) and tooling (106) employs an interlocking pneumatic chamber subassembly (1) and a stemmed plate (2) pneumatically secured in a unique "engaging registration" relationship under normal loading conditions. An annular metal bearing member (16) fixed to the chamber subassembly (1) has an elevated sealing surace (56) which provides an airtight seal only when the components are in engaging registration. An excessive load upsets the engaging registration relationship allowing air to immediately escape and the normally rigid coupling provided by the overload detection device (100) to become compliant. The reduction in pressure is concurrently sensed by a specially designed, externally mounted removable pressure sensor (3). The pressure sensor (3) includes a small snap-acting electrical switch (24) which is actuated by a loose fitting unsealed piston (27). A switch trip-point adjustment screw (34) is installed on the central axis of the piston (27). An electrical output signal from the pressure sensor (3) can be directly connected to the Emergency Stop Circuit of the robot to halt movement of the robot arm when an overload is detected.

23 Claims, 6 Drawing Sheets

ROBOT OVERLOAD DETECTION DEVICE

BACKGROUND OF THE INVENTION

1. Field of the Invention

This invention relates generally to the field of robotics and, more specifically, to overload detection devices typically mounted between the end of a robot arm and user application specific tooling. Such devices are generally designed to detect excessive loading, and in response thereto to interrupt robot arm movement and minimize damage to the robot mechanism and the tooling.

2. Background Information

Today, robotic equipment is used in many industries for a wide variety of applications. User tooling is normally attached to the mechanical wrist or end of a robot arm, via a robot tool mounting faceplate. In order to sense tooling encountered obstructions or overlimit conditions due, for example, to programming, servo errors or misplaced workpieces, overload detection devices have been developed. The primary purpose of such devices is to quickly detect and relieve excessive moment or torque loads applied to the robot tool mounting faceplate, and to simultaneously produce a signal which can be used to stop robot arm movement to prevent or minimize damage to the robot mechanism and/or robot work cell tooling and fixtures. Ideally, upon overload detection, the normally rigid coupling provided between the robot tool mounting faceplate and tooling by the overload detection device, becomes compliant to avoid damage prior to cessation of robot arm movement. After being "tripped", the device is desirably able to be "reset" to its original position with a high degree of repeatability in order to avoid the need to revise the robot program.

Since many types and sizes of robots exist, and normally the potential users' tooling and gripper configurations vary widely, a method is needed to vary the pre-load on the overload detection device so that it will quickly operate (i.e. produce a "stop" signal and become compliant) only after a certain torque or moment threshold load is exceeded.

Commercially available devices currently exist which are intended to provide such overload detection and protection. However, these devices exhibit certain disadvantages which limit their usefulness, flexibility, and ease of application.

Many of the existing devices utilize coil springs to generate a threshold force to resist the normal inertial and tool mass loads applied to the robot face plate during robot operation. For larger robots, the required number of springs and support features add significantly to the overall mass and physical size of the device. For most applications, the proper quantity, type and position of the springs is difficult to calculate, due to the large number of variables which exist. In addition, changing the device characteristics in the field is difficult and time consuming. For these reasons, the springs are usually installed by the manufacturer of the overload detection device. In order for the manufacturer to choose the proper spring complement, he must rely on the purchaser to supply data regarding the torque and moment values which must be resisted without tripping the device. The correct values are very difficult to determine, especially before the final design of the tooling is completed and tested In addition, the "correct values" change depending upon the acceleration of the robot and the position of the center of mass of the tooling relative to the robot axes. The acceleration of the robot and the position of the center of tool mass are constantly varying in most robot applications.

Furthermore, the trip-point of a spring-loaded type device is difficult to adjust if the design or configuration of the tooling is changed, as through the use of a robotic tool changing system (reference, for example, U.S. Pat. No. B1 4,664,588) or unforeseen required tooling modification. Electrical cables and hoses connected to the tooling also add additional unpredictable and variable loads to the robot arm.

Others have attempted to overcome these disadvantages by utilizing either springs in conjunction with air cylinders, or air cylinder type devices alone which allow a change in trip-point through a change in input air pressure to the device. One such prior art device described in U.S. Pat. No. 4,714,865 utilizes an air pressurized flexible bladder to generate the resistive force required.

In the air cylinder type devices some form of sensor is used to sense a relative displacement between the portion of the device attached to the robot faceplate and the portion to which the tooling is attached. This signal is then, normally, first processed through an electronic signal conditioner which then signals the robot to stop, and sometime to operate a valve which allows the pressure in the cylinder(s) or bladder to be relieved through a hose connecting the pneumatic valve to the overload detection device This series of events requires a relatively long time to occur, so that typically the compliance of the device is exhausted before robot arm motion can be completely halted, resulting in potentially damaging forces being transmitted through the robot structure and tooling components. In addition, the material of construction of the bladder-type device is subjected to substantial physical and sometimes chemical abuse which results in a relatively short service life in a typical factory environment.

Many of the earlier overload detection devices also lack good repeatability, either initially, or in some cases, after a relatively low number of "trip" cycles. Good repeatability is important since devices having poor repeatability require the robot program taught-points to be taught again, a generally unacceptable time-consuming process.

A robotic overload detection unit utilizing a pneumatically pressurized chamber to provide overload relieving capability for a robot and tooling was previously developed by the assignee of this application. In this earlier design, no air bladder, springs or air cylinders were required to provide the "clutching" (i.e. moment and torque resistive) force. Instead, an elastomeric o-ring sealed chamber was used. When an overload occurred, the o-ring seal was instantly broken, resulting in an immediate loss of resistive pressure in the chamber. The chamber pressure loss was sensed by a non-removable built-in pneumatic pressure sensor which was normally wired into the robot "Emergency Stop" circuit or other "Stop" circuit. By varying the pneumatic pressure in the chamber, the overload threshold of this device could be easily adjusted to suit the particular operating environment conditions. By utilizing a variable pressure programmable air regulator, the robot controller could dynamically change the chamber pneumatic pressure while the robot program was running.

The sealed pneumatic chamber device was sensitive to various overload conditions including moments (tipping about a z-axis), torques (rotation about the z-axis), lateral (sideways with respect to the z-axis) forces, and compressive (along the z-axis in the direction of the tool mounting faceplate) forces. The only motion that would not break the seal would be an overload condition that was a purely tensile axial force (i.e. along the z-axis in the direction away from the faceplate) with absolutely no other loading on the unit. In virtually any robotic application, this pure axial "pull" is extremely unlikely to occur.

The sealed pneumatic chamber unit is also very fast acting since the air pressure is instantly relieved by the overload force without the need for air to flow through restrictive hoses or conventional valve components. Thus, this earlier design overcame many of the shortcomings of the prior art devices Nevertheless, it too was susceptible to further improvement.

In the earlier design, the chamber sealing element was a conventional o-ring inserted into a machined groove. The o-ring groove tended to weaken the member into which it was machined due to the reduction in cross-section under the groove. If the thickness of this member was increased to compensate for this, the weight and overall height of the unit was undesirably increased. In addition, the o-ring itself proved difficult to retain in the groove due to the forces generated by the rush of air across the o-ring during the "tripping" process. A truncated "V" groove which was difficult to machine, and an adhesive, which was difficult to apply consistently were needed to retain the o-ring in the groove. The o-ring seal was also subject to deterioration due to contaminates present in the pressurizing air and materials and vapors used in the wide range of applications in which the unit could be utilized. Other difficulties encountered with the use of an elastomeric seal include deterioration of the elastomer and problems associated with maintaining good repeatability and ease of assembly caused by the relatively wide dimensional variations associated with elastomer seal manufacturing techniques.

The earlier design also employed a relatively complicated multiple staked ball bearing-detent arrangement for initial registration and compressive load bearing. Proper "Z" axis adjustment of the multiple locating elements was difficult to achieve due to parts manufacturing tolerances and normal o-ring manufacturing tolerance variations. The relative position of the elastomeric seal to the locating elements also created a locating element sealing problem because the locating elements were subjected to the chamber pneumatic pressure. A liquid sealer was required to seal the locating elements against air leaks and maintain their position.

In the prior design, an electrical switch and actuator were placed inside of the pressurized pneumatic chamber so that only the wires to the switch had to be sealed where they exited the pressure chamber. The switch was actuated by the side force of a chamfered piston against the switch actuator as the piston was forced downward by chamber pressure, and was released by upward movement of the piston caused by an imbalance in force between a piston return spring and the decreasing force generated by the falling pneumatic chamber pressure when the unit was "tripped". Unfortunately, in this earlier design, if the switch or electrical cable were damaged in operation, neither was field repairable or replaceable. Similarly, the switch operating point was not adjustable, especially after the unit was assembled. Also the switch actuation and reset points were not necessarily consistent from unit to unit due to the variable frictional forces generated by the force of the switch actuator button against the side of the piston. Moreover, a very low pressure could not be used to operate the switch since the piston return spring had to have a spring rate great enough to reliably return the piston even if the unit did not see a pressure reduction cycle for an extended period. The close fit between the piston and the piston bore also made it susceptible to sticking due to contaminates present in the chamber pressurizing air.

A need thus exists for an improved overload detection device which not only overcomes the problems of lack of durability, lack of flexibility, poor repeatability and slow reaction time exhibited by conventional overload detectors but also enhances the manufacturability, operational characteristics and field serviceability of the described earlier design.

SUMMARY OF THE INVENTION

This need is satisfied and other benefits achieved, in accordance with the principles of the present invention, through the provision of a sealed pressurized chamber overload detection device incorporating a uniquely designed metal or other non-compressive chamber bearing/sealing member and a specially designed removable and highly reliable electro-pneumatic pressure sensor. The use of the non-compressive seal eliminates the problems associated with the elastomeric seal and the complicated multiple locating and load bearing element arrangement of the earlier design. The new pressure sensor employs an electrical switch actuation technique which provides for extremely low actuator mechanism friction. This is very important in a device which must always operate reliably even after very long periods of inactivity. In addition to good low pressure repeatability, the pressure sensor of the present invention is also characterized by high pressure survival capability, relatively high electrical current capabilities, insensitivity to applied type and level of voltage, and small size.

The overload protection device of the present invention includes a pressurized fluid chamber assembly formed by a housing having a central bore concentric with a central axis of the chamber assembly. A cover plate closes one end of the bore and an annular end plate overlies the opposite end of the bore. The central opening in the annular end plate has a smaller radial extent than the bore.

The pressurized fluid chamber assembly interacts with a stemmed plate having its own central axis. The stemmed plate consists of a plate member located within the fluid chamber and having a stem extending through and out of the opening in the annular end plate. A first face of the plate member and an inner face of the annular end plate are thus positioned in opposing relationship.

The overload detection device of the present invention further includes structural elements for ensuring that the chamber assembly and stemmed plate are relatively positioned in engaging registration with their central axes coincident and with a predetermined unique rotational angular relationship. This structure preferably includes a pair of angularly offset dimple-like depressions in the first face of the plate member cooperating with a pair of similarly angularly offset hemispherical-end screws threaded through the annular end plate of the chamber assembly.

A non-compressive, e.g. metal, annular bearing member is fixed to one of the opposing faces of the plate member and annular end plate. The bearing member has a raised surface configured to fit flush against a portion of the other of said opposing faces to create a fluid tight seal therebetween only when the chamber assembly and stemmed plate are in engaging registration. Fluid pressure is applied to the plate member in the chamber to maintain the chamber assembly and stemmed plate in engaging registration with a force designed to maintain a rigid coupling under normal operating loads. Should an overload be encountered, it will force the chamber assembly and stem plate out of engaging registration allowing fluid to escape between the opposing faces and the coupling to become compliant.

The leakage of fluid past the non-compressive seal causes a reduction in fluid pressure in the chamber which is simultaneously sensed by a removable, externally mounted fluid (e.g. air) pressure sensor in fluid communication with the chamber. The sensor provides an output signal indicative of the "tripped" condition, which can be employed to interrupt robot arm movement. The sensor includes a small snap-acting electrical switch which is actuated by an unsealed and loose fitting piston responsive to changes in fluid pressure in the chamber. The piston contains an axially mounted screw which allows adjustment of the trip point of the electrical switch.

In a further aspect of the invention, the noncompressive annular bearing member is dimensioned and positioned with respect to the radial extent and depth of the plate member and bore to prevent damage to the sealing surfaces when the device is tripped.

In another aspect of the invention, a compressible, fluid permeable collar is positioned about the stem to prevent dust and other matter from contaminating the sealing surfaces.

In a further optional aspect of the present invention, a rotation limiting block fixed to the inside of the cover plate of the chamber assembly cooperates with a suitably configured cavity in the stemmed plate to limit rotational compliance. A biasing spring can be advantageously mounted in a central aperture of the rotation limiting block.

BRIEF DESCRIPTION OF THE DRAWINGS

These and other features, aspects, objects and advantages of the present invention will be more fully understood from the following detailed description, when read in conjunction with the accompanying drawings in which.

Throughout the drawing figures, like reference numbers are used to identify like parts.

DETAILED DESCRIPTION

Figure 1:
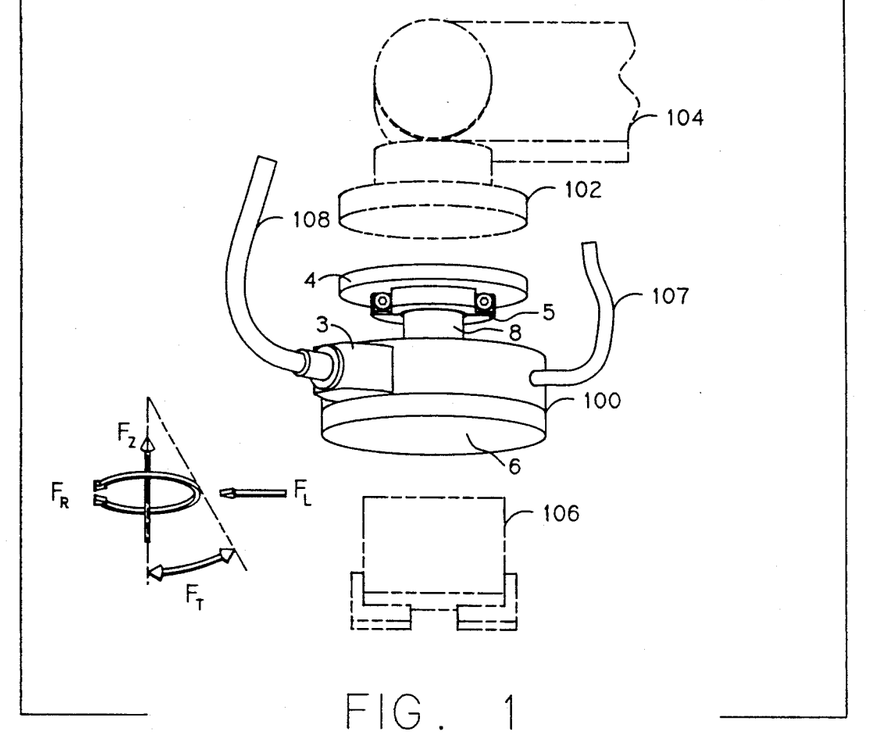
FIG. 1 is a perspective view of a robotic overload detection device constructed in accordance with the principles of the present invention.

As shown in the perspective view of FIG. 1, an overload detection device 100, constructed in accordance with the principles of the present invention, is adapted to be mounted between a mounting faceplate 102 at the end of a robot arm 104 and a user's tooling 106. The tooling is normally application specific and may comprise a gripper, a welding gun, etc., depending upon the particular use intended. The tooling may also include other robotic accessories such as an automatic tool changer (not shown) like that described in commonly assigned U.S. Pat. No. B1 4,664,588.

The overload detection device 100 is supplied with pressurized fluid through hose 107, and under normal operating conditions, provides a rigid coupling between face plate 102 and tooling 106. However, if the tooling encounters an unexpected obstruction or otherwise experiences an excessive load, device 100 provides an electrical output signal along cable 108 to the robot's "Emergency Stop" circuit or other "Stop" circuit (not shown) to halt robot arm movement. Concurrently, the coupling provided by the overload detection device becomes compliant allowing at least some relative movement between the tooling 106 and robot faceplate 102 in order to minimize any damage to the tooling or robotic equipment.

The overload detection unit 100 is capable of sensing excessive loads occurring in multiple directions including those produced by forces which are compressive $F_Z$, rotational $F_R$ (torque), tipping $F_T$ (moment), and lateral $F_L$. The device provides post "tripping" compliance along the same directions. Pure tensile forces $F_{-Z}$ will not "trip" the overload detection device but such pure axial "pull" is extremely rare in robotic applications.

Figure 2:
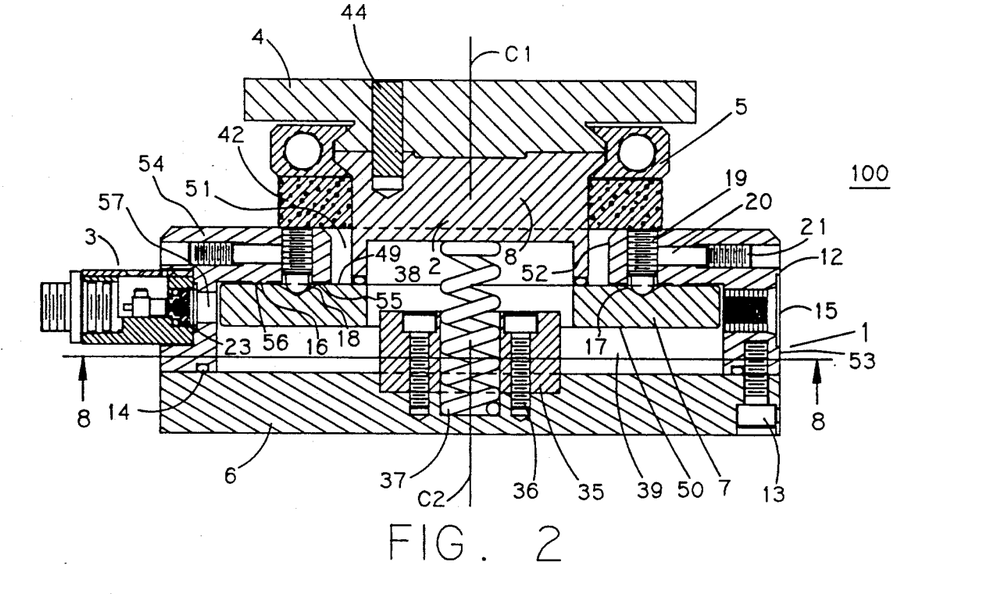
FIG. 2 is a sectional view of an overload detection device of the present invention taken along line 2—2 of FIG. 5.
Figure 3:
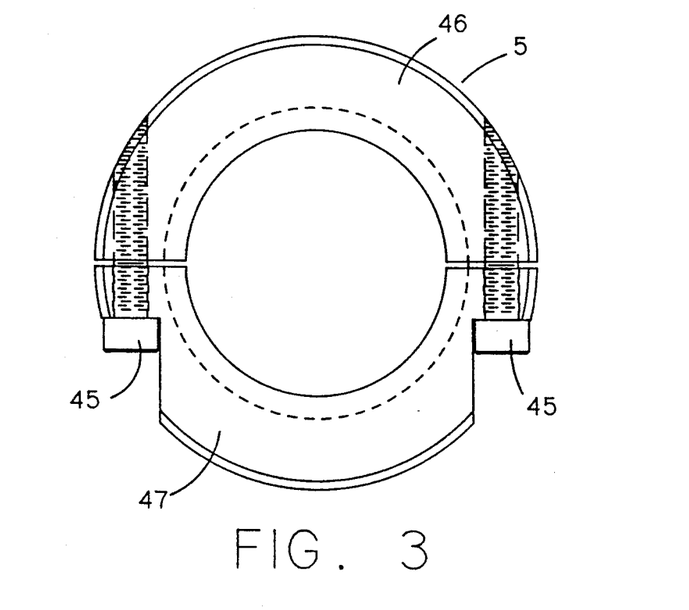
FIG. 3 is a top view of a two-piece clamp ring subassembly of the present invention shown as it would appear if removed from the other components.

As best seen in the sectional view of FIG. 2, overload detection device 100 is basically comprised of five major components/subassemblies: a pneumatic chamber subassembly 1, a stemmed plate 2 (detailed in FIGS. 4A and 4B), a pressure sensor 3 (detailed in FIGS. 9 and 10), a mounting adapter plate 4, and a two-piece clamp ring subassembly 5 (detailed in FIG. 3).

Normally the adapter mounting plate 4 is employed to mount the overload detection device 100 to the end of a robot arm. After first machining matching robot flange mounting features into adapter plate 4, this plate is then attached to the robot faceplate 102 using appropriate mounting hardware (not shown). Tooling 106 is normally attached to pneumatic chamber cover plate 6 using any of several pre-machined mounting hole patterns (not shown). Since operation of overload detection device 100 is not mounting position sensitive, the device may be mounted in inverted posture if desired.

The two-piece clamp ring subassembly 5 can then be used to secure the combination of stemmed plate 2 and the pneumatic chamber subassembly 1 to the mounting adapter plate 4 by placing the two halves 46 and 47 of the clamp ring subassembly around the mating truncated "V"-shaped flange formed by the union of the mounting adapter plate 4 and a flared end of stemmed plate 2. The two halves of the clampring subassembly 5 are fastened together by clampring attachment screws 45. Dowel pin 44 extending from adapter plate 4 is received in a corresponding cavity 48 of the stemmed plate 2 to provide radial alignment of the adapter plate 4 and stemmed plate 2.

Figure 4A:
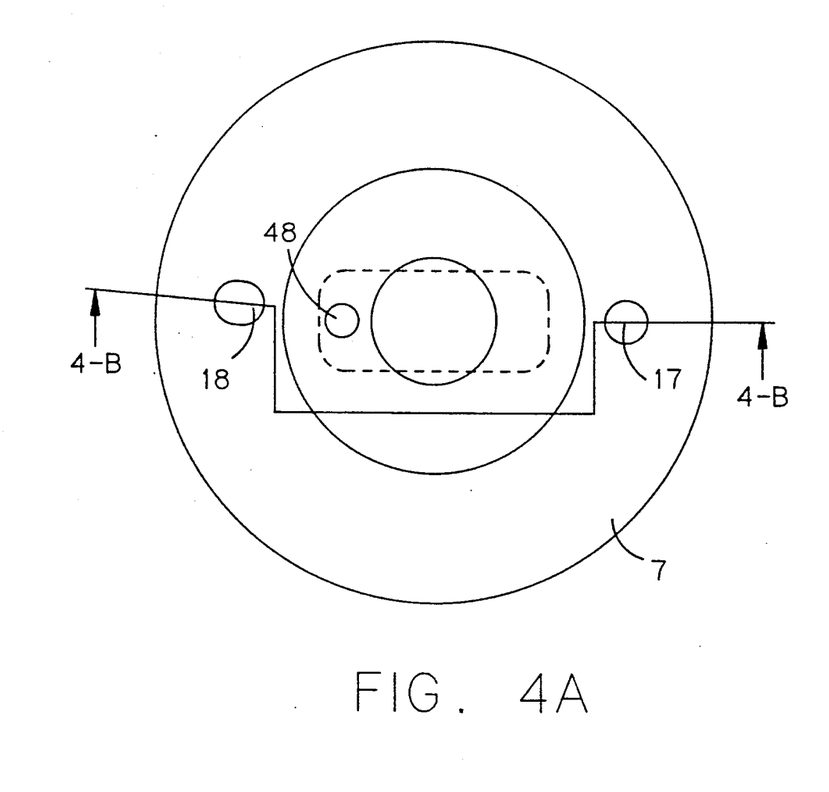
FIG. 4A is a top view of a stemmed plate shown as it would appear if removed from the pneumatic chamber subassembly of the robotic overload detection device.
Figure 4B:
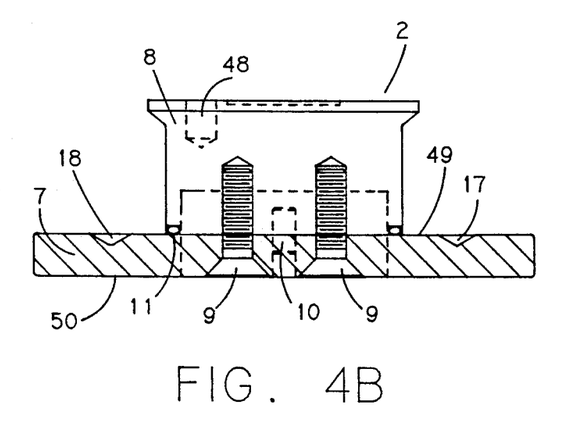
FIG. 4B is a partial sectional view of the stemmed plate taken along line 4B—4B of FIG. 4A.

Stemmed plate 2 has a central axis $C_1$ coincident with a central axis of the robot face plate 102. The stemmed plate includes a plate member or disc 7 having a stem 8 extending axially beyond a first face 49. Plate member 7 is attached to stem 8 by mounting screws 9 and locating dowel pins 10, as shown in FIG. 4B. The interface between stem 8 and plate member 7 is sealed with a static o-ring 11, although any appropriate sealant may be used to prevent air leakage. Stem 8 is preferably composed of light-weight material such as aluminum while plate member 7 is preferably constructed of very hard material such as hardened tool steel. Alternatively, stem 8 and plate member 7 can be formed as an integral unit, preferably of hardened tool steel. Stemmed plate 2 can be advantageously flash chrome plated to enhance corrosion resistance.

Figure 7:
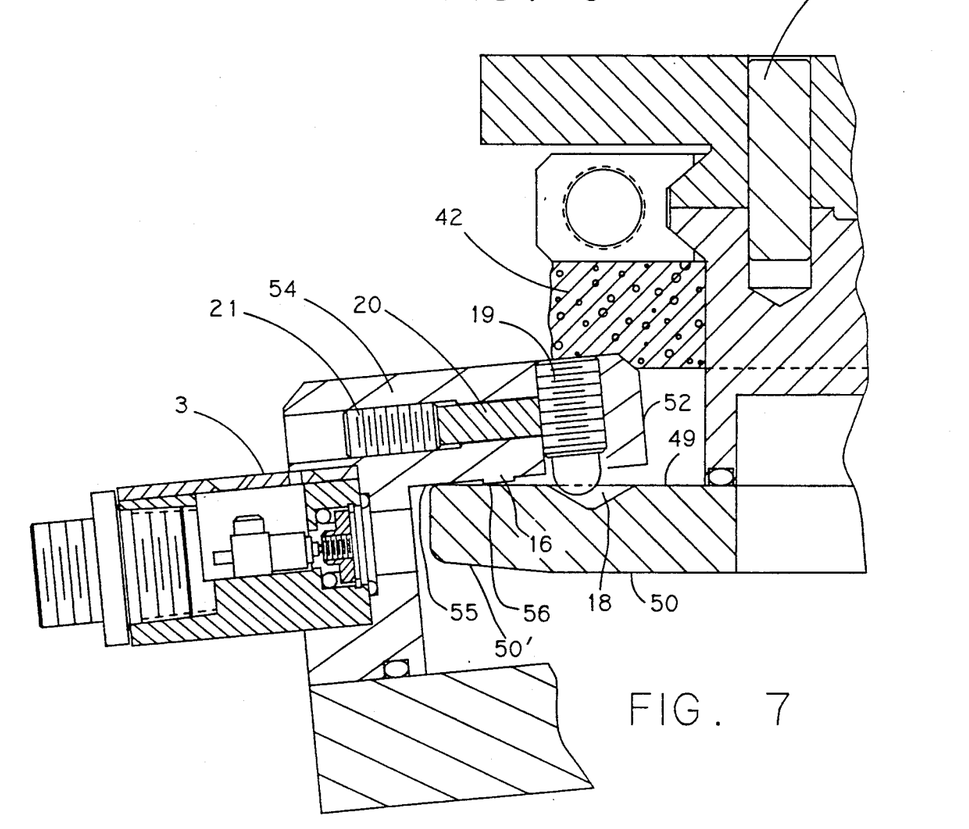
FIG. 7 is a partial enlarged view of a portion of FIG. 6.

The other face 50 of plate member 7 may be parallel to face 49 or, preferably, at least partially tapered so that the height of plate member 7 gradually decreases as the distance from central axis $C_1$ increases (See 50' in FIG. 7). The latter feature is advantageous in helping to minimize the height of chamber assembly 1. Cutouts (not shown) may be formed in face 50 to reduce the weight of plate member 7.

Referring again to FIG. 2, in operation plate member 7 is designed to fit within chamber 39 formed by pneumatic chamber subassembly 1, with stem 8 protruding through an opening 51 in pneumatic chamber subassembly 1.

Plate member 7 serves to block opening 51 in the pneumatic chamber subassembly 1 when the stemmed plate 2 is properly positioned in engaging registration with the chamber subassembly 1, as shown in FIG. 2. An air permeable compressible collar 42 is positioned about stem 8 below the two-piece clamp ring subassembly 5 in order to exclude dust or other debris from becoming trapped in the annular cavity formed between the outside of stem 8 and the inside surface 52 which defines opening 51 of chamber subassembly 1. Although debris accumulation will not cause undesirable operation while the overload detection device is in its normal operating condition, debris which becomes lodged between the sealing surfaces of the device (described hereinafter) after "tripping" of the device may prohibit satisfactory sealing when the device is "reset". Collar 42 may be composed of open-cell foam or any other compressible material which provides low resistance to air flow therethrough. For certain applications, e.g. welding, collar 42 is preferably composed of a high temperature resistant material, for example a fiberglass cloth skirt.

Pneumatic chamber subassembly 1 includes a main housing 12. Housing 12 is formed of a side wall member 53 defining a central cylindrical bore concentric with a central axis $C_2$ of the chamber assembly, and a flat annular wall member 54 extending radially inward from one end of the side wall member 53. The inner surface 52 of annular wall member 54 defines central opening 51 which is concentric with central axis $C_2$. The interior face 55 of annular wall member 54 is in opposing relationship to first face 49 of plate member 7.

The other end of main housing 12 is normally closed by cover plate 6. Plate 6 is fastened to main housing 12 by mounting screws 13, and sealed by o-ring 14. O-ring 14 is positioned inside of the bolt circle of screws 13 so that the threads of screws 13 do not require sealing against air leakage.

When initiating use of the overload detection device of the present invention, chamber subassembly 1 and stemmed plate 2 are positioned in a unique relative spatial relationship, in which their central axes $C_1$ and $C_2$ are coincident and they occupy a predetermined particular rotational angular relationship about the coincident axes. This unique spatial relationship is referred to hereinafter as "engaging registration". The cooperating elements of pneumatic chamber subassembly 1 and stemmed plate 2 which define such engaging registration will now be described.

Stemmed plate 7 is preferably constructed of a very hard material such as hardened tool steel, and has machined into its face 49 two dimple-like depressions, i.e. a cone-shaped depression 17 and an "elongated" cone-shaped depression 18. Depression 18 is elongated in a direction extending along a line running from cone-shaped depression 17 through the elongated cone-shaped depression 18, as shown in FIG. 4A. Two hardened hemispherical-end screws 19 are installed through wall member 54 of the pneumatic chamber main housing 12 so that they engage the two depressions 17 and 18 machined into plate member 7. Tapped holes in the pneumatic chamber main housing 12 into which the hemispherical-end screws 19 are threaded, and the mating depressions in plate member 7 are arranged so that stemmed plate 2 can be properly positioned with regard to chamber subassembly 1 to create a "sealed" condition (as more fully described hereinafter) at only one specific orientation. This is because the depressions (and the corresponding hemispherical-end screws) are offset from each other by an angle other than 180°. As most easily seen in the top view of FIG. 5, the angular offset between the two screws 19 (and corresponding depressions 17 and 18) is preferably close to but less than one hundred eighty degrees (180°). The included side wall angle of the depressions 17 and 18 and the radial distance of the depressions from central axis $C^1$ are preferably chosen so that the torque value required to "trip" the device in a true torque load condition is approximately equal to the moment value required to "trip" the device in a true moment load condition.

The hemispherical-end screws 19 are adjusted so that all clearance between the hemispherical-end of the screws and their mating depressions is removed. After adjustment, the position of the hemispherical-end screws 19 is maintained by the side force of lock plugs 20 against the side of the hemispherical-end screws 19. The locking force against each hemispherical-end screw 19 is generated by lock plug set screws 21, and is transmitted to the hemispherical-end screws 19 through the lock plugs 20. The lock plugs 20 are preferably constructed of a softer material (such as brass) than the hemispherical-end screws 19 so that the thread form of the hemispherical-end screws 19 will be impressed into the lock plugs 20 as the lock set screws 21 are tightened, and will not damage the hemispherical-end screw threads.

The adjustable feature of the hemispherical-end screws 19 allows the removal of all clearance between the screw ends and mating depression 17 and 18 for each device produced. This ensures highly repeatable tool orientation every time the device is "tripped" and "reset". A high pressure lubricant can be applied to the surfaces of depressions 17 and 18, and to the hemispherical-ends of screws 19 to minimize wear.

A spring 37 is installed between the pneumatic chamber cover plate 6 and stemmed plate 2. The spring 37 provides a relatively small amount of force to the stemmed plate 2 to help offset initial moment loads generated by the attached tooling when no pneumatic pressure is present in the pneumatic chamber 39. The spring 37, along with visual input provided by "alignment" marks (not shown) machined into the outside surfaces of the major components/subassemblies of the device, allows the user to easily reset the device to its initial "engaging registration" position after it has been tripped by an overload condition. Instead of the illustrated coil spring, a wave spring of greater diameter can be used for the same purpose.

As best seen in FIG. 7, an annular metal bearing member 16 having a raised sealing surface 56 is machined into the interior face 55 of housing wall member 54. Alternatively, an annular band of noncompressive or very low compressive hard material (e.g. hard metal or plastic) can be firmly secured to interior face 55 in order to form the raised sealing surface 56.

Figure 5:
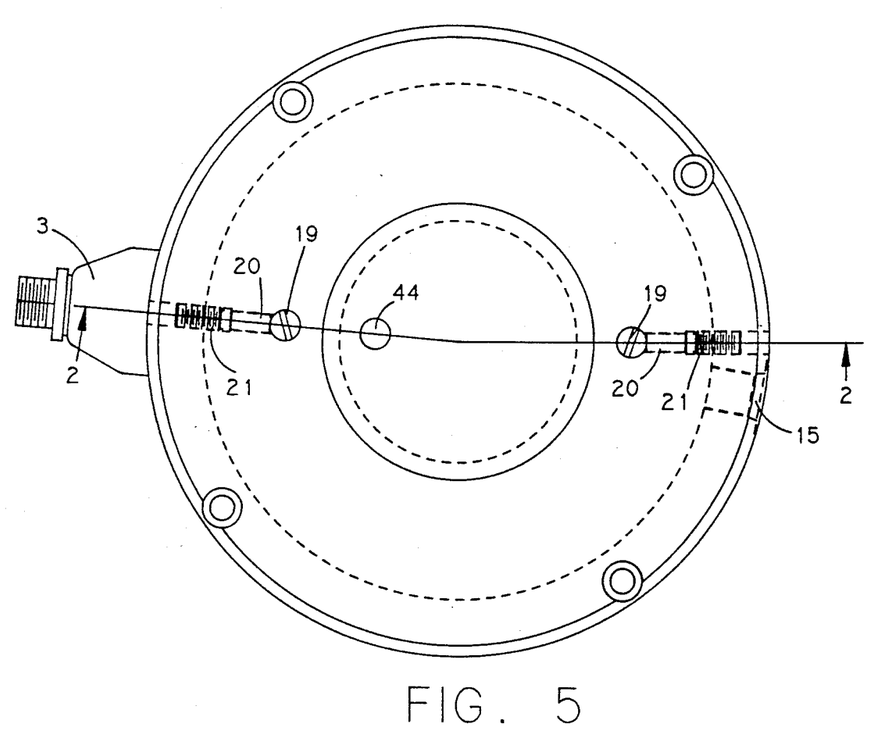
FIG. 5 is a partial top view of an overload detection device of the present invention with a mounting adapter plate and the two-piece clamp ring subassembly removed.

Pneumatic chamber assembly 1 is provided with at least one radially directed input pneumatic pressure supply port 15 machined into the side wall 53 of main housing 12. Although only one supply port 15 is shown in FIG. 5, at least two of different standards such as SAE (Society of Automotive Engineers) and NPT (National Pipe Thread) or BPT (British Pipe Thread) are preferred to permit international use of a common overload detection device.

As shown in FIG. 2, when pneumatic pressure is applied to the chamber 39 through supply port 15, the force of the pneumatic pressure against face 50 of plate member 7 forces face 49 on the opposite side of plate member 7 against the raised surface 56 of metal bearing member 16; with chamber subassembly 1 and stemmed plate 2 in engaging registration, this action produces a fluid tight seal. Stem plate 2 is rigidly held in this position with a force value related to the sealing area of surface 56 and the applied chamber pneumatic pressure.

Figure 11:
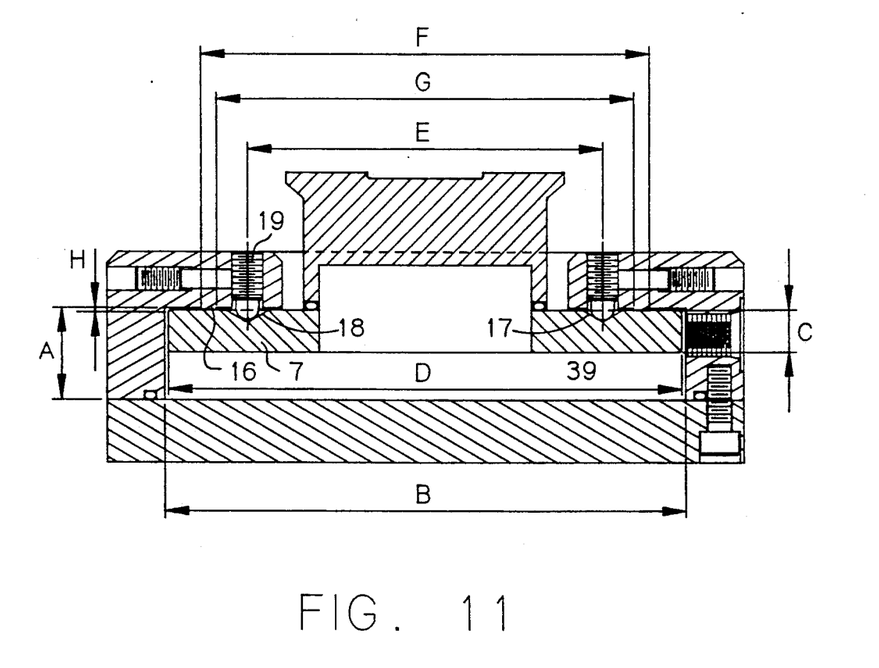
FIG. 11 is a partial sectional view highlighting dimensions which are coordinated in order to protect the sealing surfaces from damage following "tripping" of the overload protection device.

Referring briefly to FIG. 11, the inside diameter "G", outside diameter "F", and height "H" of sealing surface 56 are chosen with respect to the outside diameter "D" of plate member 7, the inside diameter "B" of chamber 39, the height "C" of plate member 7, the height "A" of chamber 39 and the position "E" of hemispherical-end screws 19 so that sealing surface 56 of metal bearing 16 and the opposing portion of face 49 on plate member 7 cannot come into damaging contact with each other or with the hemispherical-end screws 19 when the device is in a "tripped" compliant condition, i.e. no longer in engaging registration. The appropriate spatial relationship and dimensions to avoid such damaging contact can be advantageously determined through an iterative process using CAD (Computer Aided Design) equipment. By way of example, the relevant dimensions of an actual overload detection device which implements this feature of the invention are now presented along with a description of the method of deriving such values.

The following are typical values for the dimensions shown in FIG. 11:

| Dim. | mm | in |
| --- | --- | --- |
| A | 23.75 | 0.935 |
| B | 135.0 | 5.315 |
| C | 11.00 | 0.433 |
| D | 133.00 | 5.236 |
| E | 92.00 | 3.622 |
| F | 116.00 | 4.567 |
| G | 108.00 | 4.252 |
| H | 0.50 | 0.020 |

In actual practice, the seal outside diameter "F" was chosen first. It was then experimentally determined that inside diameter "G" would provide the desired pressure sealing characteristic, very low leak rate. Dimension "C" was then chosen so that minimal plate member deflection would occur when the applied chamber pressure was raised to 120 PSI. For best repeatability characteristics, the dimension "E" was made as great as possible. A maximum tip angle was then chosen, $+/-5$ for the larger size devices as defined dimensions shown above, or $+/-10$ for smaller size devices. From this starting point, the initial layout was made by making an educated guess at the dimensions "A", "B", "D", "E" and "H". The ability for the CAD system to allow movement of a group of drawing elements about relative to other elements in the drawing, and also to allow "zooming" in and out on any portion of the drawing, allowed definition of the elements of the stemmed plate as a group, and to move this group about within the "chamber" while checking for maximum attainable tip angle, interference of the hemispherical end screws with sealing surfaces, and degree of separation of the sealing surfaces due to lateral or rotational movement of the stemmed plate.

Based upon the visual feedback, dimensions were "adjusted" slightly in the direction thought to produce the desired changes, and the stemmed plate was redefined and moved about again. This operation was repeated a number of times, until the desired results were obtained. Detailed part drawings were then made based upon the dimensions obtained through the use of the above procedure, and prototype units were constructed to verify the results.

Both the sealing surface 56 of metal bearing 16 and the mating portion of opposing face 49 on plate member 7 are machined to very close tolerances and finish to ensure that a good pneumatic seal exists when chamber 39 is pressurized and chamber subassembly 1 is in engaging registration with stemmed plate 2. Pneumatic chamber main housing 12, including metal bearing 16, is preferably constructed of a strong and light-weight material such as aircraft grade aluminum. Sealing surface 56 and preferably the entire inside surface of chamber subassembly 1 is finished by a hard coating anodizing process to minimize damage which may result from any debris which may accidentally enter chamber 39.

Figure 8:
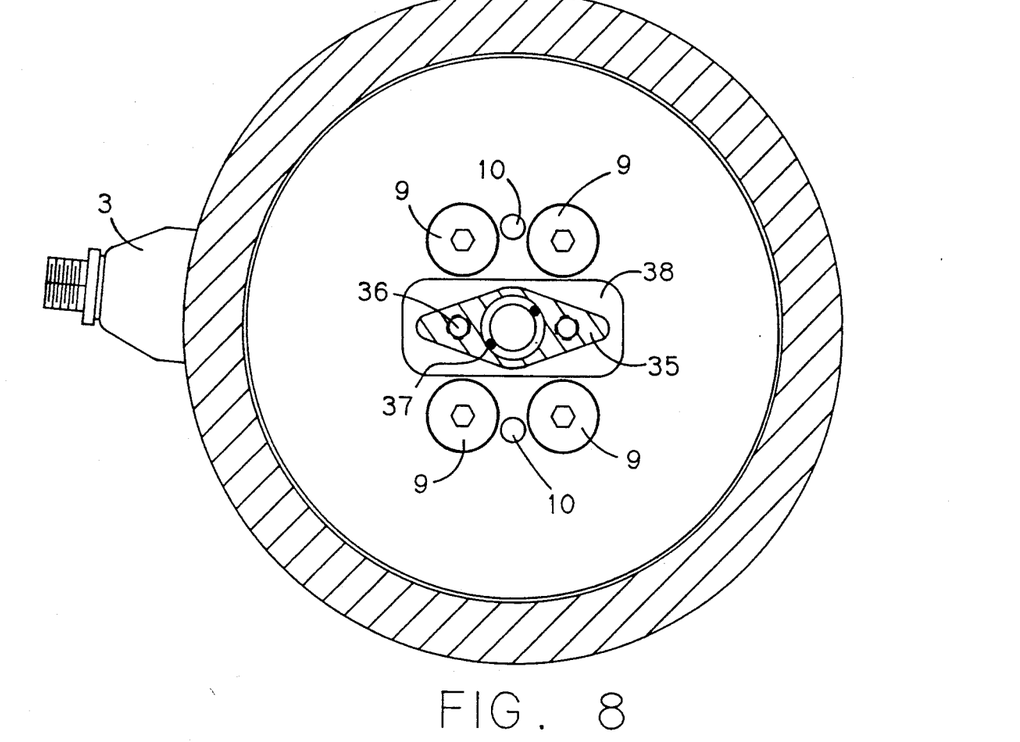
FIG. 8 is a partial bottom view taken along line 8—8 of FIG. 2 and depicting the stemmed plate shown in FIGS. 4A and 4B and the rotation limiting block shown in the sectional views of FIGS. 2 and 6.

In certain applications, it may be desirable to limit the rotational compliance afforded by overload detection device 100 after it has been "tripped". To limit the amount of rotation allowed between stemmed plate 2 and the pneumatic chamber subassembly 1, a diamond-shaped rotation limiting block 35 is installed into a similarly shaped cavity machined into the interior face of pneumatic chamber cover plate 6. As depicted in FIGS. 2 and 8, the rotation limiting block 35 is attached to cover plate 6 by mounting screws 36. A central hole through the rotation limiting block 35 provides clearance for biasing spring 37. A rectangular or other suitably shaped cavity 38 is machined through plate member 7 and into stem 8. Cavity 38 receives rotation limiting block 35 therein. After a specific amount of rotation occurs, the sides of the rotation limiting block 35 interfere with the sidewalls of cavity 38, thus prohibiting further rotation. The shape and depth of cavity 38 can be selected to impose no restrictions on the angular tipping (moment) and axial (compressive) displacement otherwise permitted between the chamber subassembly 1 and stemmed plate 2.

When fluid pressure is applied in chamber 39, and chamber subassembly 1 and stemmed plate 2 are in engaging registration, the raised flat surface 56 of bearing member 16 fits flush against the opposing top face 49 of plate member 7. The pneumatic pressure in chamber 39 can be regulated to adjust the resistive force of this rigid coupling. When an overload condition occurs, pneumatic chamber subassembly 1 and stemmed plate 2 are forced out of engaging registration breaking the seal and instantaneously allowing air to escape between the opposing faces 49 and 55 of the stemmed plate 2 and chamber subassembly 1. This produces a reduction in the air pressure within chamber 39 which is sensed by pressure sensor 3.

Pressure sensor 3 is especially designed to consistently operate at low pressures and to also survive high pressures. Sensor 3 also has relatively high electrical current capabilities and is generally insensitive to the type and level of applied voltage. This pressure sensor is also characterized by small size and ready removability and replacement.

Figure 9:
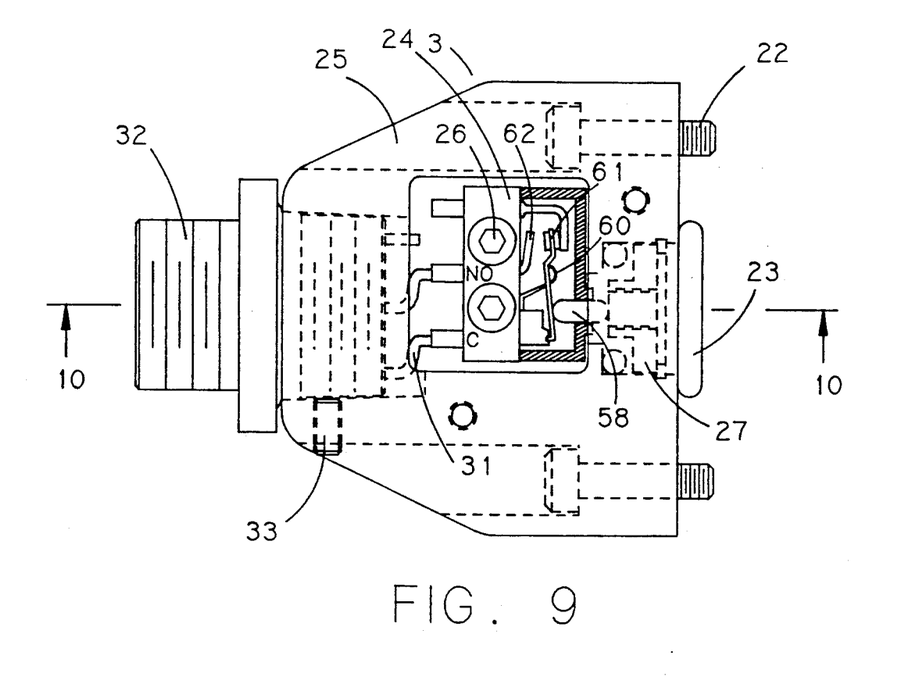
FIG. 9 is a top view of the pressure sensor shown with the sensor cover removed.
Figure 10:
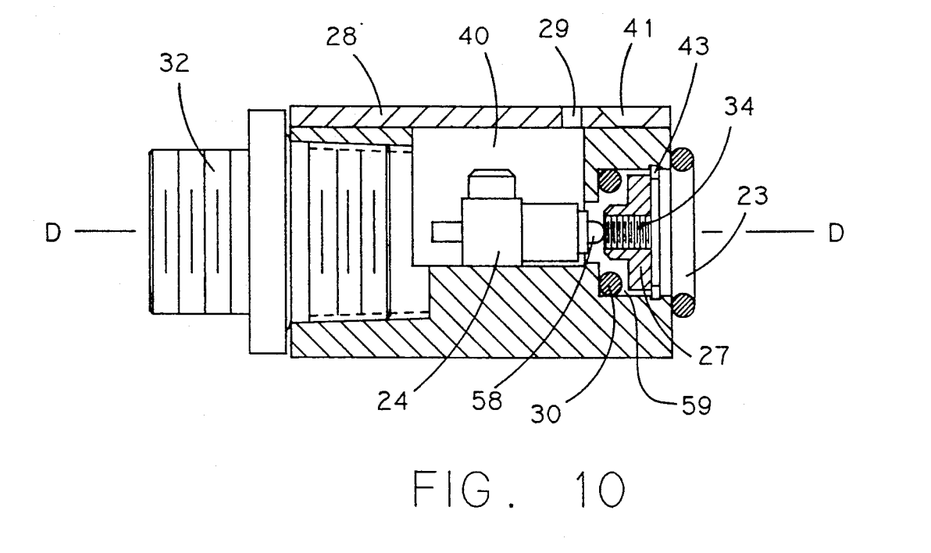
FIG. 10 is a partial sectional view of the pressure sensor taken along line 10—10 of FIG. 9.

Pressure sensor 3 will be described in detail. Referring to FIGS. 9 and 10, the removable pressure sensor 3 is attached to the pneumatic chamber main housing 12 by mounting screws 22, and is mounted in such a manner as to cover a hole 57 drilled radially through the side wall 53 of pneumatic chamber main housing 12. Hole 57 (shown in FIGS. 2, 6 and 7) serves as a passage between pneumatic chamber 39 and pressure sensor 3, so that the pressure sensor is exposed to the same level of pneumatic pressure as is contained in chamber 39. An o-ring 23 is used to seal against pneumatic pressure loss between pressure sensor 3 and the pneumatic chamber main housing 12. A small snap acting electrical switch 24 is mounted to the interior of sensor housing 25 by switch mounting screws 26 in such a manner as to cause the electrical switch's actuation plunger 58 to be aligned with the axial center line D-D of a hole 59 in the sensor housing 25. Hole 59, in turn, is in alignment with the aforementioned radial hole 57 drilled through the side wall 53 of pneumatic chamber main housing 12.

Bore hole 59 of pressure sensor 3 contains a loose fitting piston 27 which is normally in contact with the actuator plunger 58 of electrical switch 24. A piston retaining ring 43 retains piston 27 in bore hole 59 whenever the pressure sensor is removed from the pneumatic chamber main housing 12.

With pressure sensor 3 mounted to housing 12, piston 27 is moved towards chamber 39 by a low force spring 60 contained within the electrical switch 24. Since the outside circumference of piston 27 is not sealed in piston bore 59, as pneumatic pressure is applied to the main pneumatic chamber 39, some air flows around the piston 27 and into the cavity 40 which contains electrical switch 24. Cavity 40 is normally covered by sensor cover 28 held in place by screws 41. Cover 28 has a small vent hole 29 drilled through it so that air which bypasses the outside circumference of the piston will be vented to atmospheric pressure. This vent hole ensures that the switch side of piston 27 will be at a lower pneumatic pressure than the pressure in pneumatic chamber 39 as the device is being pressurized.

As the air pressure in chamber 39 rises, piston 27 is moved against the electrical switch 24 actuator spring force by the force of the chamber pressure acting against the chamber side of piston 27, which causes the normally-open electrical switch contacts of switch 24 to "close". After the normally-open electrical switch contacts 61 and 62 "close", the piston 27 continues to move the switch actuator plunger 58 a small additional distance before movement of piston 27 is restricted by a sealing o-ring 30 which is positioned between switch 24 and the piston 27 coaxial to center line D-D. The contact between the end of piston 27 and o-ring 30 blocks further airflow from the main pneumatic chamber 39 to sensor cavity 40, prohibiting the escape of air when the overload detection device is in its normal "in use" state with switch 24 actuated.

In order to accommodate component manufacturing tolerances and variations in operating characteristics of electrical switch 24, a switch trip-point adjustment screw 34 is installed on the central axis of piston 27 so that the effective length of the piston can be adjusted as required to cause the switch 24 to trip slightly before the movement of piston 27 is stopped by sealing o-ring 30. Adjustment screw 34 is locked in place and sealed against airflow along its threads by a chemical thread-locking liquid. Electrical wires 31 are used to connect the electrical terminals of switch 24 to the electrical terminals of an electrical interface connector 32. Connector 32 is threaded into a mating threaded hole machined into sensor housing 25, and is locked in place by a lock screw 33. The connecting electrical cable 108 (FIG. 1) is used to connect the electrical interface connector 32 to the robot controller or emergency stop electrical circuit (not shown).

The operation of the overload detection device of the present invention will now be described. After mounting the device between a robot faceplate and user's tooling, chamber subassembly 1 and stemmed plate 2 are positioned relative to each other until engaging registration is achieved. In this position, and in this position only, a fluid tight seal is created at the raised surface 56 of bearing member 16 when stemmed plate 2 is pressed against the sealing surface by pressure in chamber 39. Air is the normal pressurizing gas, although other inert gases or, in special circumstances, other fluids, may also be employed. The pressure of the air in chamber 39 can be varied so that the threshold force required to upset the "engaging registration" relationship between chamber subassembly 1 and stemmed plate 2 can be changed by the user to suit particular requirements.

Figure 6:
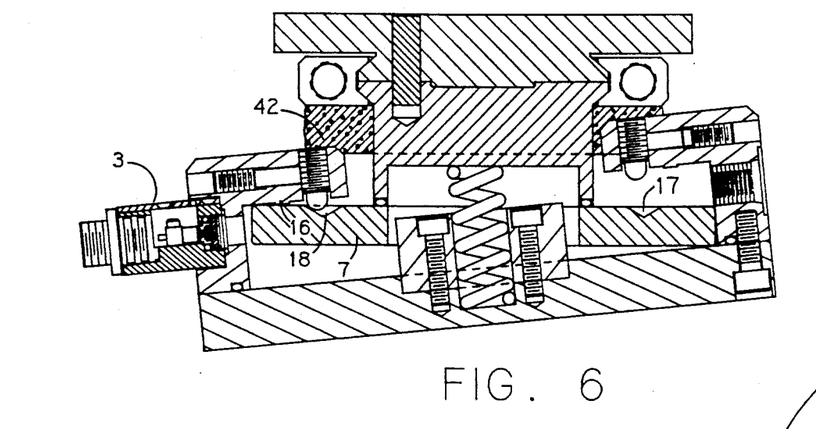
FIG. 6 is a sectional view similar to FIG. 2 except that the relationship of the parts to each other are shown with the device in a completely "tripped" condition.

When a "moment" type overload condition occurs, the pneumatic chamber subassembly 1 is forced to be tipped with respect to stemmed plate 2 (as shown in FIGS. 6 and 7), allowing the air in chamber 39 to be instantly vented to atmosphere through the large opening created between the housing 12 and plate member 7 by the tipping action. In a "torque" type or "lateral force" type overload condition, the torque or side load causes the hemispherical-end screws 19 to be forced to slide up the ramp surface created by the mating cone-shaped depressions 17 and 18. This causes the plate member 7 to be forced away from the sealing surface of metal bearing 16 of the pneumatic chamber main housing 12. The gap created by this motion allows the air in the pneumatic chamber 39 to quickly escape to atmosphere. Similarly, an excessive compressive force along the coincident central axes of the device will overcome the resistive sealing force permitting air to escape to atmosphere.

At the same time, the decreasing pneumatic pressure in chamber 39 is sensed when the loose fitting piston 27 is moved away from switch 24 by the unbalanced spring force on piston 27 created by the switch actuator's internal "return" spring 60. The switch 24 is wired "normally-open" so that the emergency stop circuit of the robot is interrupted when the overload threshold is exceeded. The angular and axial compliance permitted between stemmed plate 2 and chamber subassembly 1 once the device is "tripped", allows additional robot arm movement during the time between the actual overload occurrence and the halting of robot arm motion. In a "crash" situation, the movement of plate member 7 against the force of the initial pneumatic pressure in chamber 39, provides a shock absorbing effect as the pressure falls from its initial value to a pressure of 0 PSIG. This shock absorbing effect, the compliance of the coupling, and the directly wired emergency stop signal all serve to reduce the chances of damage to the robot equipment and tooling from an overload condition.

From the preceding detailed description, it will be apparent that a new robotic overload detection device has been developed which overcomes the shortcomings of the prior art and provides numerous advantages. The use of a non-compressible machined-in metal sealing surface allows the entire sealing surface to bear all of the extremely high loads generated by the force of the air pressure on the stemmed plate. This permits the elimination of the multiple locating and load bearing elements of the earlier design. The metal seal also eliminates the problem of o-ring seal deterioration and dislodgement. Somewhat surprisingly, the unconventional metal to metal sealing interface has been found to provide an effective fluid tight seal. Appropriate location and dimensioning of the bearing member and other components of the device ensure that the sealing surfaces are not damaged when the device is "tripped" and becomes compliant.

Placement of the pressure sensor outside of the pressurized chamber allows the sensor switch and its actuation components to be mounted in a removable housing. This facilitates easy field replacement of the sensor should the switch become damaged. In addition, the use of the external electrical connector allows easy field replacement of a damaged or worn electrical cable.

The use of a loose fitting unsealed piston in the pressure sensor, along with the elimination of a separate return spring and the positioning of the switch to be axially actuated by the piston (instead of side actuated) allows the overload detection device to be reliably operated down to a pressure as low as 3-5 PSIG. Frictional forces in the pressure sensor are thus practically non-existent. The sealing of the piston against an o-ring at the end of the piston travel immediately after switch actuation occurs, prohibits air from leaking from the device while protecting the switch from contaminates which may be present in the chamber air. The switch-trip point adjusting screw installed on the central axis of the piston enables component manufacturing tolerances and variations in the operating characteristics of the electrical switch to be readily accommodated.

In combination, the various improved features of the present invention result in a robotic overload detection device having enhanced sensitivity, operating life and serviceability.

Although a specific presently preferred embodiment of the invention has been described and depicted herein, it will be apparent to those skilled in this art that various modifications, additions, substitutions and the like can be made without departing from the spirit of the invention, the scope of which is defined by the claims appended hereto.

What is claimed is:

1. An overload detection device adapted to be positioned intermediate tooling and an end of a robot arm for detecting excessive loading and protecting the tooling and robot arm against damage resulting therefrom, comprising:

a pressurized fluid chamber assembly including a housing having a central bore concentric with a central axis of the chamber assembly, a cover plate closing one end of said bore, and an annular end plate overlying an opposite end of said bore, the annular end plate having a central opening therethrough concentric with the central axis, said opening having a radial extent less than that of the bore;

a stemmed plate having a central axis, the stemmed plate comprising a plate member located within the bore, said plate member having a radial extent intermediate that of the opening in the annular end plate and the bore of the housing, the plate member having a stem extending axially beyond a first face of the plate member such that the stem protrudes out of the chamber assembly through the opening in the annular end plate, said first face of the plate member and an inner face of the annular end plate comprising opposing faces;

means for relatively positioning the chamber assembly and stemmed plate into engaging registration with their central axes coincident and with a predetermined unique rotational angular relationship therebetween;

a non-compressive annular bearing member fixed to one of said opposing faces, said bearing member having a raised surface configured to fit flush against a portion of the other of said opposing faces to create a fluid tight seal therebetween only when the chamber assembly and stemmed plate are in engaging registration;

means for controllably applying fluid pressure to the plate member to maintain the chamber assembly and stemmed plate in engaging registration with a force designed to maintain a rigid coupling therebetween under normal operating loads; and sensor means for sensing a loss of said engaging registration and providing an output signal indicative thereof, whereby a load in excess of said normal operating loads will force the chamber assembly and stemmed plate out of engaging registration allowing fluid to escape between the opposed faces and the coupling to become compliant, and causing the sensor means to provide said output signal.

2. The device of claim 1 wherein the annular bearing member, plate member and bore are dimensioned to prevent damage to the raised surface and to said portion of the other of said opposing faces when the chamber assembly and stemmed plate are out of engaging registration.

3. The device of claim 2 wherein the means for relatively positioning the chamber assembly and the stemmed plate into engaging registration comprises:

a first dimple-like depression in the first face of the plate member;

a second dimple-like depression in the first face of the plate member, said second dimple-like depression being angularly offset from said first dimple-like depression by an angle other than 180°; and first and second hemispherical-end screws angularly offset by the same angle as the first and second dimple-like depressions, said first and second hemispherical-end screws being threaded through the annular end plate to engage the first and second dimple-like depressions, respectively.

4. The device of claim 3 wherein said first depression is cone-shaped and the second depression has an elongated cone-shape, said second depression having an elongation extending in a direction defined by a line from the first depression through the second depression.

5. The device of claim 4 wherein the offset angle comprises an angle close to 180 ; and further comprising means for locking each hemispherical-end screw in a position such that all clearance between a hemispherical-end of the screw and the depression engaged by the screw is removed.

6. The device of claim 5 wherein each of said depressions and the hemispherical-end of each of said screws has a hardened surface, and wherein a high pressure lubricant is applied to said hardened surfaces.

7. The device of claim 2 wherein the one of said opposing faces to which the bearing member is fixed comprises an inner face of the annular end plate, the other of said opposing faces comprises the first face of the plate member, and wherein the annular bearing member is integral with the annular end plate.

8. The device of claim 7 wherein the annular end plate is constructed of a strong lightweight metal material and the annular bearing member is machined out of said metal material.

9. The device of claim 8 wherein the raised surface of the bearing member and the portion of the first face of the plate member engaged by said raised surface are machined to close tolerances to ensure a fluid tight seal therebetween.

10. The device of claim 9 wherein the raised surface of the bearing member is flat and is provided with a hard finishing coating.

11. The device of claim 10 wherein the means for relatively positioning the chamber assembly and the stemmed plate into engaging registration comprises:

a first dimple-like depression in the first face of the plate member;

a second dimple-like depression in the first face of the plate member, said second dimple-like depression being angularly offset from said first dimple-like depression by an angle other than 180°; and first and second hemispherical-end screws angularly offset by the same angle as the first and second dimple-like depressions, said first and second hemispherical-end screws being threaded through the annular end plate to engage the first and second dimple-like depressions, respectively; and wherein the hemispherical-end screws are radially interior of said annular bearing member.

12. The apparatus of claim 11 further comprising a fluid-permeable resilient collar surrounding a portion of the stem external of said chamber assembly to prevent matter from entering the opening in the annular end plate.

13. The device of claim 12 wherein said fluid comprises air and wherein said collar is composed of material which provides a low resistance to airflow and exhibits a high-temperature resistance.

14. The device of claim 10 further comprising a mounting adapter plate and means for firmly securing the mounting adapter plate to an end of the stem remote from the plate member.

15. The device of claim 7 further comprising means for limiting rotational movement of the compliant coupling.

16. The device of claim 15 wherein the means for limiting rotational movement comprises:

a shaped block extending along the central axis of the chamber assembly, said block being fixed to the cover plate; and a cavity extending along the central axis of the stemmed plate through the plate member and into the stem, said cavity being configured and dimensioned to receive and allow only limited rotation of the block therein.

17. The device of claim 16 wherein the block is provided with a central aperture and a spring is mounted in said aperture, said spring serving to provide an initial spring-bias to the stemmed plate in a direction away from the cover plate.

18. The device of claim 1 wherein said sensor means comprises a removable pressure sensor externally mounted to the chamber assembly, said pressure sensor being in fluid communication with a pressurized fluid chamber formed within the chamber assembly, the pressure sensor detecting a reduction in fluid pressure in the chamber when fluid escapes between the opposing faces due to excessive loading, and providing an output signal indicative thereof.

19. The device of claim 18 wherein said pressure sensor comprises:

a snap-acting electrical switch having normally open electrical contacts;

a loose fitting unsealed piston axially aligned with an actuator of the electrical switch, said piston responding to the controllably applied fluid pressure in the chamber by displacing the switch actuator a sufficient distance to cause the normally open contacts of the electrical switch to move to a closed position; and a low force switch actuator return spring which displaces the piston sufficiently to allow the closed contacts of the electrical switch to return to an open state when a reduction in the fluid pressure in the chamber occurs.

20. The device of claim 19 wherein the pressure sensor further includes a switch trip-point adjustment screw installed on a central axis of the piston to allow for adjustment of the effective length of the piston.

21. The device of claim 12 wherein the sensor means comprises a removable pressure sensor externally mounted to the chamber assembly, said pressure sensor being in fluid communication with a pressurized fluid chamber formed within the chamber assembly, the pressure sensor detecting a reduction in fluid pressure in the chamber when fluid escapes between the opposing faces due to excessive loading, and providing an output signal indicative thereof, the pressure sensor comprising:

- a snap-acting electrical switch having normally open electrical contacts;
- a loose fitting unsealed piston axially aligned with an actuator of the electrical switch, said piston responding to the controllably applied fluid pressure in the chamber by displacing the switch actuator a sufficient distance to cause the normally open contacts of the electrical switch to move to a closed position; and
- a low force switch actuator return spring which displaces the piston sufficiently to allow the closed contacts of the electrical switch to return to an open state when a reduction in the fluid pressure in the chamber occurs.

22. The device of claim 21 wherein the bore is cylindrical; the plate member comprises a disc; the sensor comprises a pneumatic pressure sensor; and the pressure sensor further includes a switch trip-point adjustment screw installed on a central axis of the piston to allow for adjustment of the effective length of the piston.

23. The device of claim 22 wherein the first face of the disc is flat and orthogonal to the central axis of the stemmed plate; and wherein at least a portion of the disc has a dimension in a direction parallel to the central axis of the stemmed plate which diminishes as distance from said central axis increases.

* * * * *